US008320941B2

(12) United States Patent
Ichinose

(10) Patent No.: US 8,320,941 B2
(45) Date of Patent: Nov. 27, 2012

(54) MOBILE TERMINAL AND METHOD FOR DISPLAYING DATA ADDED LOCATION INFORMATION

(75) Inventor: Takashi Ichinose, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 293 days.

(21) Appl. No.: 12/723,052

(22) Filed: Mar. 12, 2010

(65) Prior Publication Data

US 2011/0070895 A1 Mar. 24, 2011

(30) Foreign Application Priority Data

Sep. 24, 2009 (JP) ................................ P2009-218743

(51) Int. Cl.
*H04W 24/00* (2009.01)
(52) U.S. Cl. ................ 455/457; 455/456.12; 455/456.2; 455/456.3; 455/566; 701/23; 701/24; 701/25; 701/208; 701/211
(58) Field of Classification Search .................. 455/457, 455/456.1, 456.2, 456.3, 566; 701/23, 24, 701/25, 26, 207, 208, 211, 213
See application file for complete search history.

(56) References Cited

U.S. PATENT DOCUMENTS

| 5,908,465 | A | * | 6/1999 | Ito et al. ......................... 701/532 |
| 6,243,030 | B1 | * | 6/2001 | Levine ..................... 340/995.12 |
| 6,266,614 | B1 | * | 7/2001 | Alumbaugh .................. 701/468 |
| 6,856,898 | B1 | * | 2/2005 | Tompkins et al. ............ 701/428 |
| 6,915,204 | B1 | * | 7/2005 | Heideman ..................... 701/527 |
| 6,924,748 | B2 | * | 8/2005 | Obradovich et al. .......... 340/905 |
| 7,603,360 | B2 | * | 10/2009 | Ramer et al. .......................... 1/1 |
| 2003/0069029 | A1 | * | 4/2003 | Dowling et al. .............. 455/456 |
| 2009/0192702 | A1 | * | 7/2009 | Bourne ......................... 701/200 |
| 2010/0262362 | A1 | * | 10/2010 | Naito et al. ................... 701/204 |

FOREIGN PATENT DOCUMENTS

| JP | 2007-028020 A | 2/2007 |
| JP | 2007-193455 A | 8/2007 |

* cited by examiner

*Primary Examiner* — Temica M Beamer
(74) *Attorney, Agent, or Firm* — Maschoff Gilmore & Israelsen

(57) ABSTRACT

A mobile terminal has a current-location information acquisition unit configured to acquire current-location information indicating a current location of the mobile terminal, a direction information acquisition unit configured to acquire direction information indicating a direction of orientation of the mobile terminal, a storage unit configured to store data added location information, a search unit configured to search for at least one of the data having the location information that is located in the direction from the current location of the mobile terminal and that falls within a predetermined range around the direction based on the current-location information and the direction information, and a display control unit configured to cause the retrieved data to be displayed.

18 Claims, 16 Drawing Sheets

MOBILE TERMINAL AND METHOD FOR DISPLAYING DATA ADDED LOCATION INFORMATION

BACKGROUND OF THE INVENTION

1. Field of the Invention

The present invention relates to a mobile terminal and method for displaying data added location information that allows searching for data with an intuitive operation and displaying the retrieved data.

2. Description of the Related Art

Today, mobile terminals such as mobile phones are known that have various sensors so that detection results obtained by the sensors are used to perform various sorts of processing.

Japanese Patent Laid-Open No. 2007-193455 discloses a mobile phone provided with various sensors such as a GPS sensor, a temperature sensor, and an acceleration sensor. When a list of input candidates predicted from a user-input character is displayed, various input candidates corresponding to the user's current state are displayed to simplify the user's text input operation. This mobile phone retrieves input candidates from a dictionary database based on an input character. If the retrieved input candidates include one corresponding to any of the sensors, a detection output of the sensor corresponding to that input candidate is displayed as one of the input candidates it a list. For example, if the input candidates retrieved from the dictionary database include an input candidate "temperature," the mobile phone displays the current temperature detected by the temperature sensor as one of the input candidates, like "25° C." for example.

Japanese Patent Laid-Open No. 2007-28020 discloses a mobile terminal apparatus provided with a direction sensor, allowing switching to desired operation only by changing the orientation of the apparatus. When the current direction is measured by the direction sensor, the mobile terminal apparatus searches a direction-based setting table based on the measured direction. According to setting details corresponding to the measured direction, a ring alert is controlled or an automatic answering message is selected to reply to a caller.

Today, some mobile terminals store various types of data, such as contact information having location information added thereto, image data, and the like. Still some mobile terminals have a GPS function for obtaining their current location and a geomagnetic sensor capable of detecting the direction. However, no mobile terminals have been known that effectively utilize the GPS function and the like in order to appropriately present data such as the contact information with location information to a user.

SUMMARY OF THE INVENTION

The present invention has been made in view of such circumstances, and an object thereof is to provide a mobile terminal and method that allows searching for data with an intuitive operation and displaying the retrieved data.

To solve the problems described above, a mobile terminal according to the present invention has a current-location information acquisition unit configured to acquire current-location information indicating a current location of the mobile terminal; a direction information acquisition unit configured to acquire direction information indicating a direction of orientation of the mobile terminal; a storage unit configured to store data added location information; a search unit configured to search for the data that is located in the direction from the current location of the mobile terminal and that falls within a predetermined range around the direction based on the current-location information and the direction information; and a display control unit configured to cause the retrieved data to be displayed.

Further, a method for displaying data added location information according to the present invention includes the steps of: preparing a mobile terminal storing the data added the location information; acquiring current-location information indicating a current location of the mobile terminal; acquiring direction information indicating a direction of orientation of the mobile terminal; searching for at least one of the data having the location information that is located in the direction from the current location of the mobile terminal and that falls within a predetermined range around the direction based on the current-location information and the direction information; and displaying the retrieved data.

The mobile terminal and the method for displaying data added location information according to the present invention allows searching for data with an intuitive operation and displaying the retrieved data.

DETAILED DESCRIPTION OF THE PREFERRED EMBODIMENTS

Embodiments of a mobile terminal and a method for displaying data added location information according to the present invention will be described with reference to the accompanying drawings.

Figure 1A:
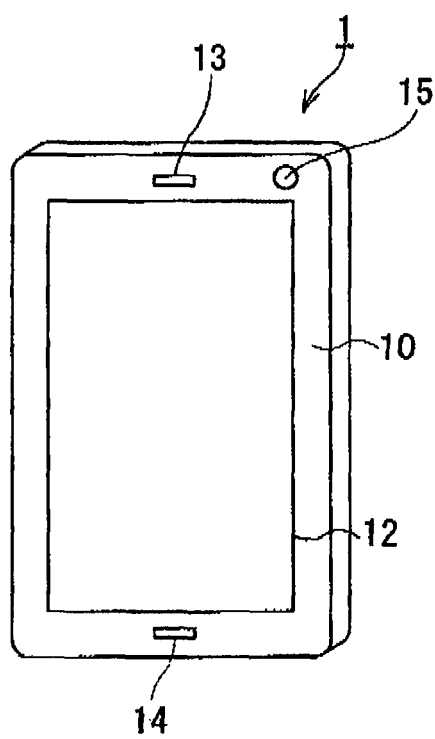
FIGS. 1A and 1B are an external perspective view from a side.
Figure 1B:
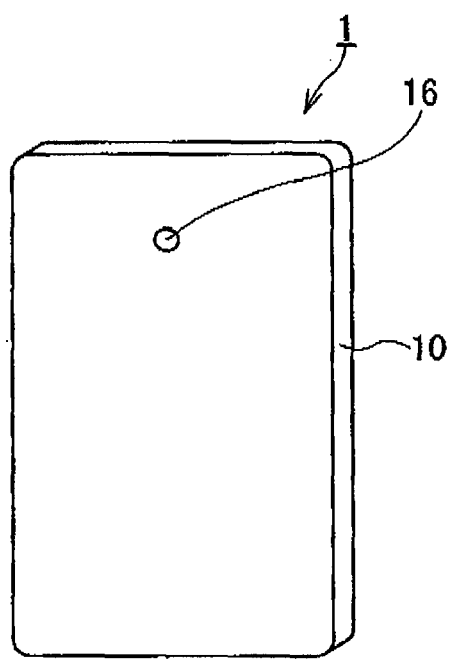

FIGS. 1A and B are external perspective views showing an embodiment of the mobile terminal according to the present invention. FIG. 1A is an external perspective view from a side corresponding to the front side of the mobile terminal 1. FIG. 1B is an external perspective view from a side corresponding to the back side of the mobile terminal 1.

The mobile terminal 1 includes a rectangular plate-like housing 10. The surface of one side of the housing 10 is largely occupied by a touch panel 12. The touch panel 12 functions as a display unit and an operation unit.

The touch panel 12 as the display unit (a display unit 42 in FIG. 2) has an area for displaying data including text and images. The display unit consists of an LCD (Liquid Crystal Display), an organic EL (ElectraLuminescence) display, or an inorganic EL display, for example.

The touch panel 12 as the operation unit (an operation unit 41 in FIG. 2) is a touch sensor by which an action of contacting with an operation surface is detected as input position information. The touch panel 12 consists of devices arranged on the top side of the display for detecting a contacting action, and a transparent operation surface further layered on the devices. A contacting action on the touch panel 12 may be sensed by employing a pressure-sensitive method for sensing a change in pressure, an electrostatic method for sensing an electric signal caused by static electricity, or other methods.

A microphone 14 is provided under the touch panel 12, A receiver (speaker) 13 is provided over the touch panel 12. The mobile terminal 1 collects a user's voice during a call through the microphone 14 and outputs voice of a party on the other end through the receiver 13.

An in-camera 15 provided on the front side of the housing 10 and an out-camera 16 provided on the back side include an imaging device that consists of a CCD, CMOS, and the like. The in-camera 15 and the out-camera 16 (cameras 15 and 16) perform photoelectric conversion on a subject image provided by a shooting optical system, and generates an image signal.

Antennas for transmission and reception (an antenna 31 and a GPS antenna 46 in FIG. 2, to be described later) are provided at predetermined places inside the mobile terminal 1. Through these internal antennas, the mobile terminal 1 transmits and receives radio waves to and from base stations and GPS satellites (both not shown).

A battery pack (not shown) is attached on the back side of the housing 10. Once a power-on instruction is received, the mobile terminal 1 supplies power to each circuit unit from the battery pack to start the circuit unit and make it operable.

Figure 2:
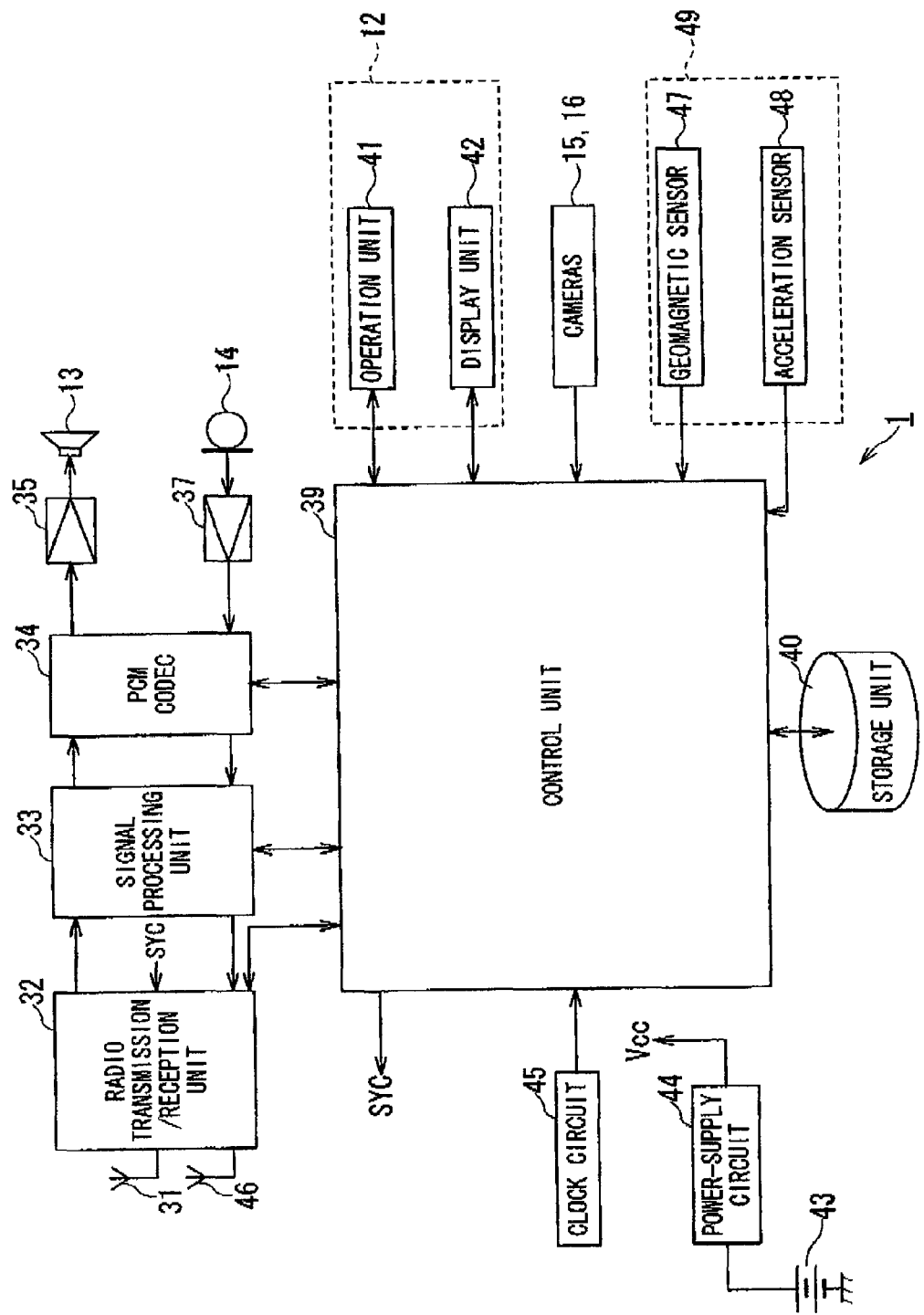
FIG. 2 is a schematic functional block diagram showing an embodiment of the mobile terminal according to the present invention.

FIG. 2 is a schematic functional block diagram showing an embodiment of the mobile terminal according to the present invention.

The mobile terminal 1 includes the antenna 31, the GPS antenna 46, a radio transmission/reception unit 32, a signal processing unit 33, a PCM codec 34, a reception amplifier 35, a transmission amplifier 37, a control unit 39, a storage unit 40, a battery 43, a power-supply circuit 44, a clock circuit 45, and a six-axis sensor 49.

The mobile terminal 1 can perform voice communications and data communications in predetermined radio communication schemes including not only the W-CDMA scheme but also the GSM scheme, cdma2000 1xRTT scheme, EVDO scheme, and E-UTRA scheme, which is radio access of the 3.9 generation LTE system. The antenna 31, the radio transmission/reception unit 32, and the signal processing unit 33 support predetermined schemes.

The antenna 31 receives radio signals through the air transmitted in predetermined communication processing systems from a base station incorporated in a mobile communication network. The antenna 31 emits radio signals in predetermined access schemes to the air so that the signals can be wirelessly communicated in predetermined communication processing systems.

The radio transmission/reception unit 32 wirelessly communicates in various communication processing schemes via the antenna 31 with a base station incorporated in the mobile communication network. The radio transmission/reception unit 32 generates, based on a modulation signal generated in the signal processing unit 33, a radio signal of a carrier frequency designated by the control unit 39. The radio transmission/reception unit 32 also receives a radio signal of a carrier frequency designated by the control unit 39, and mixes the signal with a local oscillation signal output from a frequency synthesizer to perform frequency conversion of (down-convert) the signal into an intermediate frequency signal. The radio transmission/reception unit 32 then quadrature-demodulates the down-converted intermediate frequency signal and outputs a reception baseband signal. This reception result is output to the signal processing unit 33 and the control unit 39.

The signal processing unit 33, which includes a DSP (Digital Signal Processor), performs predetermined signal processing on the reception baseband signal to obtain reception packet data in a predetermined transmission format. The signal processing unit 33 also demodulates a voice signal contained in the reception packet data and decodes the demodulation result to obtain voice data and the like. The voice data obtained by the decoding processing is supplied to the PCM codec 34. The PCM codec 34 PCM-decodes the voice data and outputs a PCM-decoded analog audio data signal to the reception amplifier 35. The analog audio signal is amplified by the reception amplifier 35 and output through the receiver 13.

A voice signal (analog audio signal) of a speaker (user) input to the microphone 14 is amplified by the transmission amplifier 37 to an appropriate level and PCM-coded by the PCM codec 34. The PCM-coded audio signal is input to the signal processing unit 33. The signal processing unit 33 encodes the audio signal to generate a modulated signal based on voice data obtained by the encoding and on other data, and outputs the generated modulated signal to the radio transmission/reception unit 32.

The control unit 39 includes at least one CPU (Central Processing Unit), ROM (Read Only Memory), and RAM (Random Access Memory). The CPU performs various sorts of processing according to programs stored in the ROM, as well as various application programs and control programs, including an operating system (OS), loaded from the storage unit 40 into the RAM. The CPU centrally controls the mobile terminal 1 by generating various control signals and providing them to each unit. The RAM stores data as appropriate, such as data necessary for the CPU to perform various sorts of processing.

The storage unit 40 consists of, for example, a flash memory device or an HDD (Hard Disk Drive), which are electrically rewritable and erasable nonvolatile memory. The storage unit 40 stores various application programs and various data sets for execution by the CPU of the control unit 39, control programs and control data for the mobile terminal 1, and identification information uniquely assigned to the mobile terminal 1 or to the user. The storage unit 40 also stores other data as appropriate, such as: telephone book data in which names, telephone numbers, addresses, and location information, for example, are registered as contact information; data acquired by data communication; downloaded data; and image data shot with the cameras 15 and 16. The power-supply circuit 44 generates a predetermined operating power-supply voltage Vcc based on output of the battery 43 and supplies it to each circuit unit. The mobile terminal 1 is provided with the clock circuit (timer) 45 that counts the current time.

The GPS antenna 46 receives GPS waves (GPS information) from GPS satellites (not shown). The GPS information includes: identification information about a GPS satellite indicating a sender; and transmission time information. The GPS information is input to the control unit 39 via the signal processing unit 33. The control unit 39 uses the acquired GPS information to compute current-location information (latitude and longitude information) indicating the current location of the mobile terminal 1. The current-location information is preferably computed from three or four pieces of GPS information, for example. Instead of the current-location information determined based on the GPS information, the location of the mobile terminal 1 acquired from a base station incorporated in the mobile communication network may be used as the current-location information.

The six-axis sensor 49 is a sensor including an acceleration sensor 48 in three axis directions for detecting the moving state of the mobile terminal 1, and a geomagnetic sensor 47 in three axis directions for detecting the angle of the housing 10 of the mobile terminal 1 with respect to a horizontal plane. In this embodiment, the six-axis sensor 49 functions as a direction information acquisition unit, an action detection unit, and a tilt detection unit. The six-axis sensor 49 is provided inside the housing 10, and it has the x-axis and y-axis defined in a plane parallel to the front and back sides of the housing 10, and the z-axis defined in the direction perpendicular to the front and back sides, for example.

In order to detect whether or not the mobile terminal 1 has moved, i.e., whether or not it remains stationary, the acceleration sensor 48 outputs, as detected values in the three axis directions, a detection result of the acceleration applied to the mobile terminal 1 in a certain direction. The acceleration sensor 48 outputs the detected values to the control unit 39. The geomagnetic sensor 47 is a sensor that detects the geomagnetism in the x-direction, y-direction, and z-direction of the housing. The geomagnetic sensor 47 outputs a detection result of geomagnetic components in these directions as detected values in the three axis directions. The geomagnetic sensor 47 outputs the detected values to the control unit 39.

The mobile terminal 1 in this embodiment is designed to show, to the user, data sifted based on an intuitive operation performed by the user on the mobile terminal 1. Different sorts of processing performed in the mobile terminal 1 will be specifically described below. The following description will be given for cases where data showed to the user is contact information registered in a telephone book.

Figure 3:
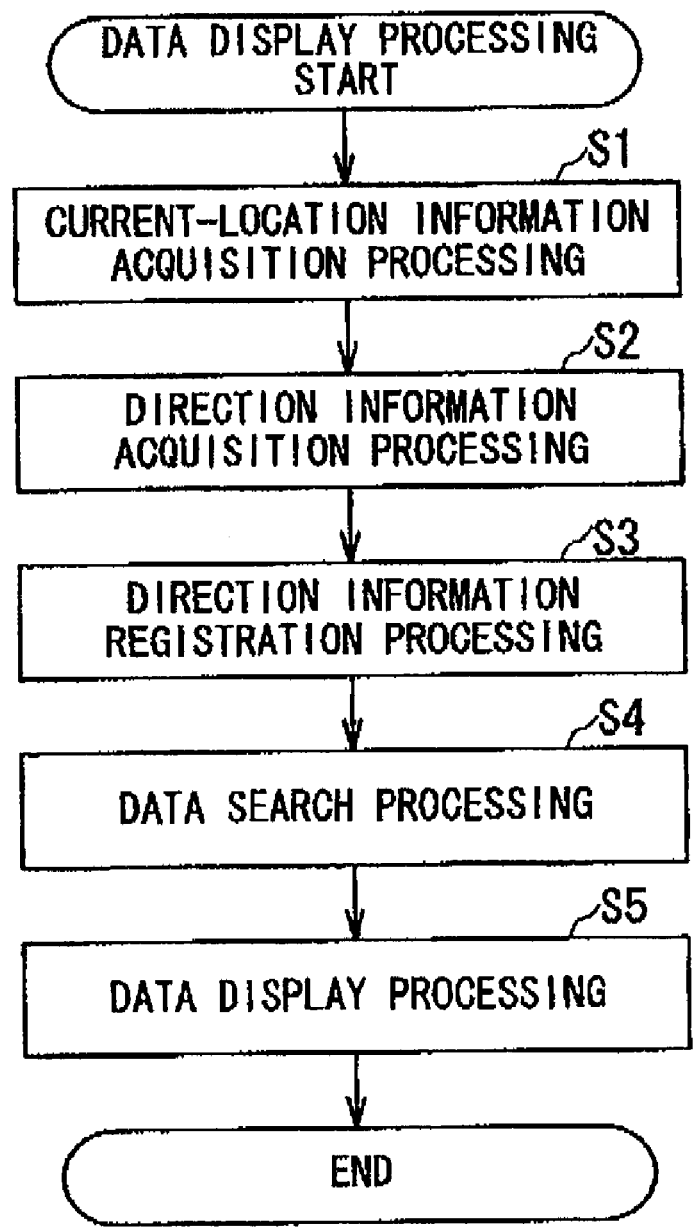
FIG. 3 is a flowchart describing the outline of overall data display processing performed by the control unit of the mobile terminal in this embodiment.

FIG. 3 is a flowchart describing the outline of overall data display processing performed by the control unit 39 of the mobile terminal 1 in this embodiment.

The data display processing is started when, for example, a direction-based search method is selected among methods of searching the contact information registered in the telephone book.

Figure 4:
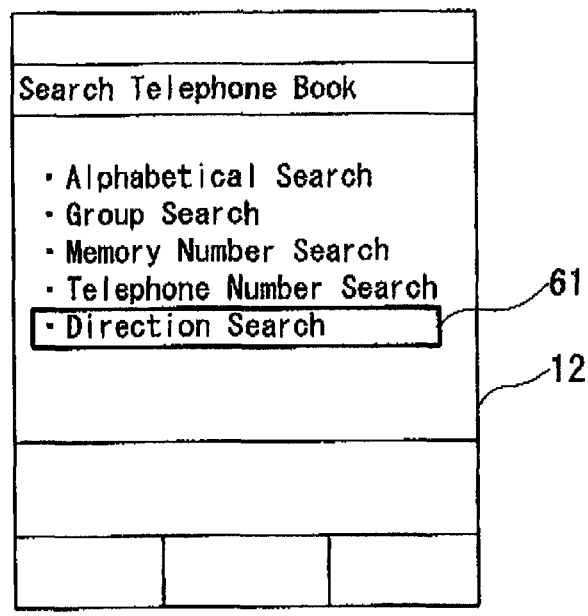
FIG. 4 is a diagram showing exemplary display for selecting a method of searching the contact information registered in the telephone book.

FIG. 4 is a diagram showing exemplary display for selecting a method of searching the contact information registered in the telephone book. FIG. 4 shows an example in which a cursor 61 movable among search methods is over "Direction Search." The data display processing is started by selecting this "Direction Search." When the direction search is selected, an image that facilitates recognition of the direction (e.g., the north direction) may be displayed on the touch panel 12 (the display unit 42) to allow the user to orient the mobile terminal 1 to a desired direction.

Figure 5:
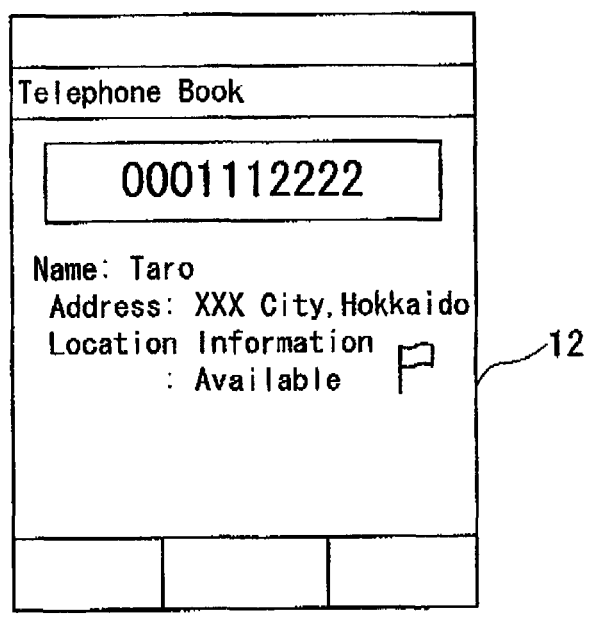
FIG. 5 is a diagram showing exemplary display of the contact information registered in the telephone book.

The contact information searchable by the direction search has location information added thereto in advance. FIG. 5 is a diagram showing exemplary display of the contact information registered in the telephone book. Registered in the contact information is information such as a telephone number (in FIG. 5, 0001112222), name (Taro), address (XXX City, Hokkaido), and availability of the location information (Available). The location information may be, for example, latitude and longitude information acquired using the GPS information or may be information arbitrarily input by the user.

In step S1, the control unit 39 performs current-location information acquisition processing. The current-location information acquisition processing is processing in which the control unit 39 as a current location information acquisition unit acquires, based on the GPS information received via the GPS antenna 46, current-location information that consists of the latitude and longitude of the mobile terminal 1.

In step S2, the control unit 39 performs direction information acquisition processing. The direction information acquisition processing is processing in which the control unit 39 as a direction information acquisition unit acquires current direction information about the mobile terminal 1 based on the direction detected by the geomagnetic sensor 47.

In step S3, based on the current-location information acquired in the current-location information acquisition processing in step S1 and the direction information acquired in the direction information acquisition processing in step S2, the control unit 39 performs direction information registration processing. The direction information registration processing is processing of using the current-location information and the direction information to compute the direction of orientation of the mobile terminal 1 as a direction line extending from the current location.

In step S4, the control unit 39 searches for contact information with location information falling within a predetermined distance from the direction line computed in the direction information registration processing in step S3.

In step S5, the control unit 39 displays retrieved contact information on the touch panel 12 (the display unit 42). Since only contact information in the direction of orientation of the mobile terminal 1 is retrieved and displayed, the user can intuitively search for and view desired contact information without performing any input operations using the touch panel 12 (the operation unit 41).

Now each processing step performed in the current-location information acquisition processing in step S1 to the data display processing in step S5 will be specifically described.

Figure 6:
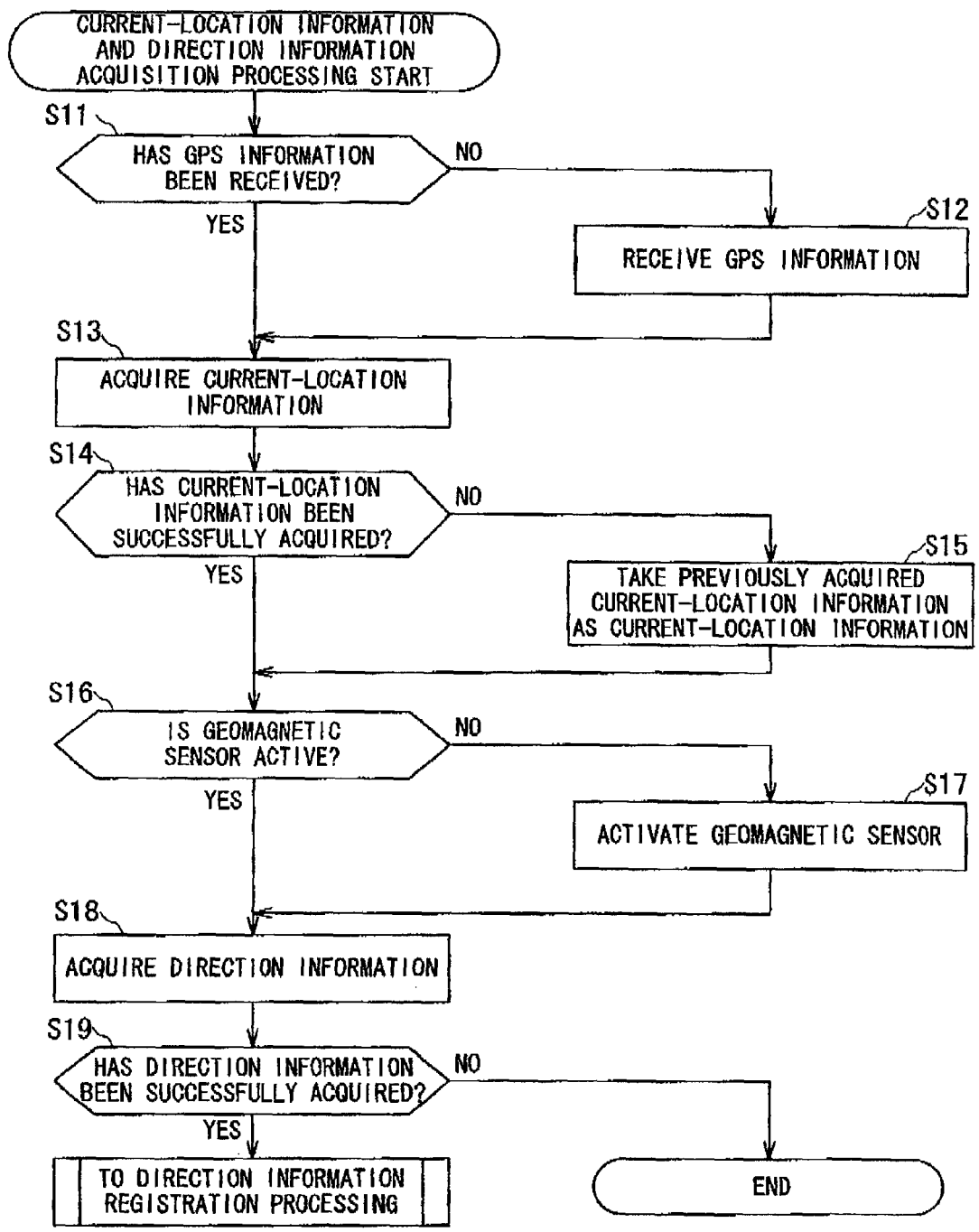
FIG. 6 is a flowchart describing the current-location information acquisition processing and the direction information acquisition processing performed by the control unit of the mobile terminal in this embodiment.

FIG. 6 is a flowchart describing the current-location information acquisition processing (step S1 in FIG. 3) and the direction information acquisition processing (step S2) performed by the control unit 39 of the mobile terminal 1 in this embodiment.

In step S11, the control unit 39 determines whether or not the GPS information (GPS waves) has been received via the GPS antenna 46. If it is determined that the GPS information has not been received, the control unit 39 starts receiving the GPS information in step S12.

Once the GPS information is received, the control unit 39 uses the received GPS information to acquire current-location information about the mobile terminal 1 in step S13. That is, the control unit 39 acquires information about the latitude and longitude indicating the current location of the mobile terminal 1.

In step S14, the control unit 39 determines whether or not the acquisition of the current-location information has succeeded. If it is determined that the acquisition of the current-location information has failed, in step S15, the control unit 39 takes, as the current-location information, current-location information acquired in previously performed current-location information acquisition processing. In the description here, the previously acquired current-location information is used in step S15 if the acquisition of the current-location information has failed. However, step S13 of acquiring the current-location information and step S14 of determining whether the current-location information has been acquired may be repeated until the current-location information is successfully acquired. Alternatively, instead of the current-location information acquired from the GPS information, the location of the mobile terminal 1 acquired by communicating with a base station may be used as the current-location information.

If it is determined that the acquisition of the current-location information has succeeded, the control unit 39 determines whether or not the geomagnetic sensor 47 is active in step S16. If it is determined that the geomagnetic sensor 47 is not active, the control unit 39 activates the geomagnetic sensor 47 in step S17.

Once the geomagnetic sensor 47 is activated, in step S18, the control unit 39 acquires the current direction of orientation of the mobile terminal 1 as direction information based on a detection result of geomagnetic components detected by the geomagnetic sensor 47.

In step S19, the control unit 39 determines whether or not the acquisition of the direction information has succeeded, If it is determined that the acquisition of the direction information has failed, the control unit 39 terminates the current-location information and direction information acquisition processing. The failure of the acquisition of the direction information means that the direction information acquisition processing in step S2 and the subsequent processing in the data display processing of FIG. 3 cannot be performed. Therefore, the data display processing is terminated as a failure of the direction search for the contact information in the mobile terminal 1. In the description here, the data display processing is terminated upon determination of the failure of the acquisition of the direction information in the direction information acquisition determination step S19. However, the direction information acquisition step S18 and the direction information acquisition determination step S19 may be repeated until the direction information is successfully acquired.

If it is determined that the acquisition of the direction information has succeeded, the control unit 39 terminates the current-location information and direction information acquisition processing and proceeds to the direction information registration processing (step S3 in FIG. 3).

Figure 7:
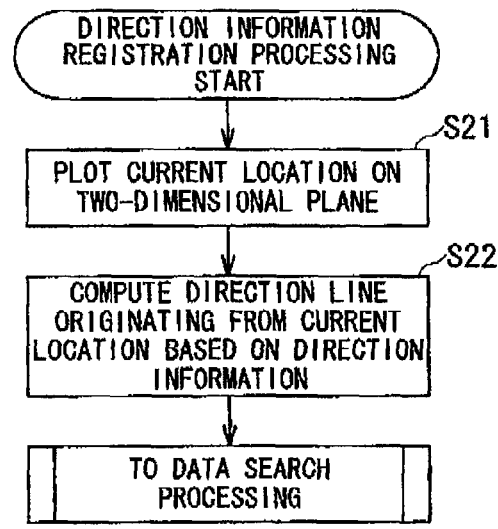
FIG. 7 is a flowchart describing the direction information registration processing performed by the control unit of the mobile terminal in this embodiment.
Figure 8:
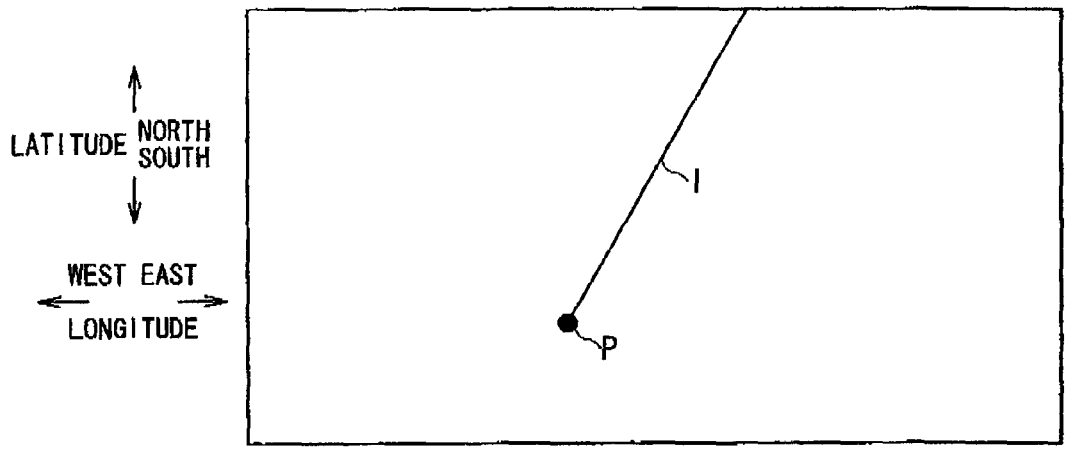
FIG. 8 is a conceptual view of a virtual two-dimensional plane for conceptually describing the direction information registration processing.

FIG. 7 is a flowchart describing the direction information registration processing (step S3 in FIG. 3) performed by the control unit 39 of the mobile terminal 1 in this embodiment. FIG. 8 is a conceptual view of a virtual two-dimensional plane for conceptually describing the direction information registration processing.

In step S21, the control unit 39 plots the current location of the mobile terminal 1 on the two-dimensional plane based on the current-location information. This two-dimensional plane is a plane in which the latitude is the ordinate and the longitude is the abscissa, for example. In FIG. 8, a current location P has been plotted on the two-dimensional plane.

In step S22, based on the direction information, the control unit 39 computes the direction of orientation of the mobile terminal 1 as a direction line originating from the current location. In FIG. 8, a direction line l computed based on the direction information extends from the current location P on the two-dimensional plane, Thus, the location information registration processing is terminated, and the process proceeds to the data search processing.

Figure 9:
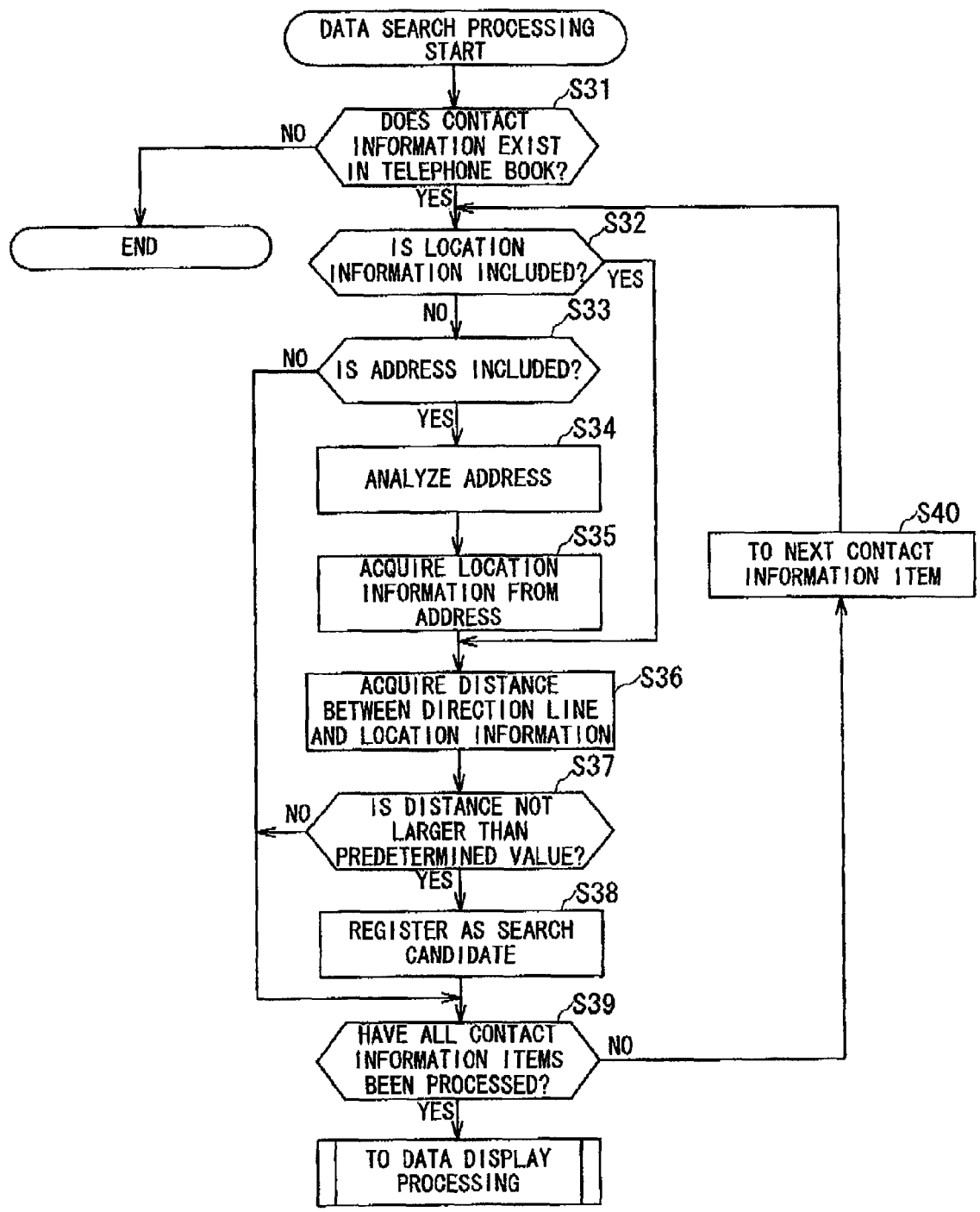
FIG. 9 is a flowchart describing the data search processing performed by the control unit of the mobile terminal in this embodiment.

FIG. 9 is a flowchart describing the data search processing (step S4 in FIG. 3) performed by the control unit 39 of the mobile terminal 1 in this embodiment.

In step S31, the control unit 39 determines whether or not contact information registered in the telephone book exists. If it is determined that contact information does not exist, the control unit 39 terminates the data search processing and the data display processing (FIG. 3) because of the absence of data to be searched for.

If it is determined that contact information registered in the telephone book exists, in step S32, the control unit 39 determines whether or not location information is registered in a contact information item. If it is determined that location information is registered in the contact information item, the control unit 39 proceeds to distance acquisition step S36.

If it is determined that location information is not registered in the contact information item, in step S33, the control unit 39 determines whether or not an address is registered in the contact information item. If it is determined that an address is not registered in the contact information item, the control unit 39 proceeds to checking step S39.

If it is determined that an address is registered in the contact information item, in step S34, the control unit 39 analyzes the address for determining the location information from the address, In step S35, the control unit 39 acquires the location information from the analyzed address. The mobile terminal 1 has a location information conversion table so that the location information can be acquired from an address even if the location information is not registered in the contact information. The location information conversion table is an information table in which predetermined latitudes and longitudes are assigned in advance on a prefectural or municipal basis, for example. Each prefectural or municipal unit may be assigned the latitude(s) and longitude(s) of one or more points, or a certain range of latitudes and longitudes. The control unit 39 refers to the location information conversion table based on the analyzed address and acquires a latitude and longitude corresponding to the address as the location information.

In step S36, the control unit 39 determines the distance between the location information and the direction line l indicating the direction registered in the location information registration processing (FIG. 7).

Figure 10:
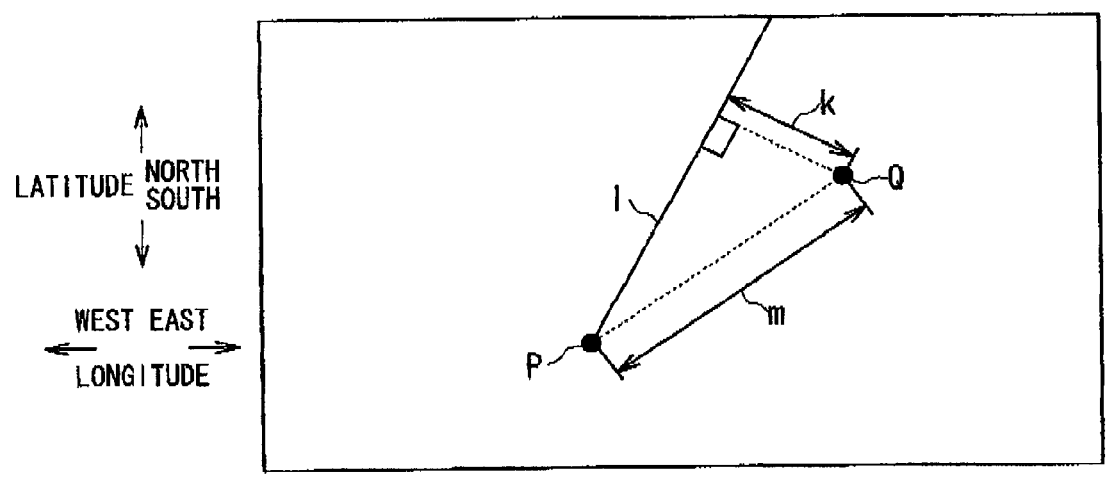
FIG. 10 is a conceptual view in determining a distance k between the direction line l and location information Q on a two-dimensional plane.

FIG. 10 is a conceptual view in determining a distance k between the direction line l and location information Q on a two-dimensional plane. The control unit 39 plots either the location information registered in the contact information or the location information determined from the address, at a corresponding latitude and longitude on the two-dimensional plane. In FIG. 10, the location information Q has been plotted. The control unit 39 determines the distance k between this location information Q and the direction line l.

In step S37, the control unit 39 determines whether or not the distance k determined in the distance acquisition step S36 is not larger than a predetermined value. The predetermined value used for this determination is set to a large value if it is desired to widen the range of contact information to be searched for, or to a small value if it is desired to accurately search for contact information that matches the current direction.

If it is determined that the distance k is not larger than the predetermined value, in step S38, the control unit 39 registers the contact information item with this location information as a search candidate to be displayed in the data display processing (step S5 in FIG. 3) to be described later. If it is determined that the distance k is larger than the predetermined value, the control unit 39 excludes this contact information item from the data display processing and proceeds to step S39.

In step S39, the control unit 39 determines whether or not the processing from the location information determination step S32 to the search candidate registration step S38 has been finished for all contact information items registered in the telephone book. If it is determined that contact information items exist for which the processing from the location information determination step S32 to the search candidate registration step S38 has not been finished, the control unit 39 repeats the processing for the remaining unprocessed contact information items in the same manner (step S40).

If it is determined that the processing from the location information determination step S32 to the search candidate registration step S38 has been finished for all the contact information items, the control unit 39 terminates the data search processing and proceeds to the data display processing (step S5 in FIG. 3).

In the above description, the address of a contact information item without the location information is analyzed to acquire the location information. However, a contact information item without the location information may be excluded from the search without analyzing the address. That is, the address determination step S33 to the location information acquisition step S35 may be omitted.

Figure 11:
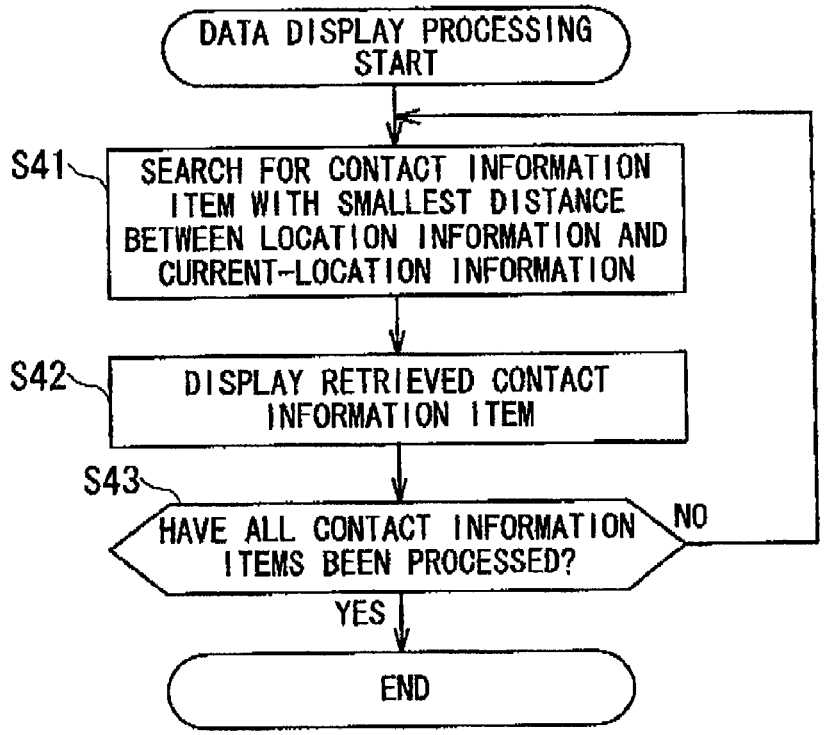
FIG. 11 is a flowchart describing the data display processing performed by the control unit of the mobile terminal in this embodiment.

FIG. 11 is a flowchart describing the data display processing (step S5 in FIG. 3) performed by the control unit 39 of the mobile terminal 1 in this embodiment.

In step S41, the control unit 39 searches for a contact information item such that the distance between the location information and the current-location information is the smallest among the contact information items registered as the search candidates in the data search processing. The distance between the location information and the current-location information can be determined from the difference in latitude and longitude included in these pieces of information. Taking FIG. 10 as an example, the contact information items registered as the search candidates are searched for a contact information item such that the distance m between the location information Q and the current-location information P is the smallest.

In step S42, the control unit 39 as the display control unit displays the retrieved contact information item with the smallest distance on the touch panel 12 (the display unit 42).

In step S43, the control unit 39 determines whether or not the search step S41 and the display step S42 have been performed for all the contact information items registered as the search candidates in the data search processing. If it is determined that contact information items exist for which the search step S41 and the display step S42 have not been performed, the control unit 39 returns to the search step S41 and repeats the processing until the search step S41 and the display step S42 are performed for all the contact information items registered as the search candidates.

If it is determined that the search step S41 and the display step S42 have been performed for all the contact information items registered as the search candidates, the control unit 39 terminates the data display processing.

In the above data display processing, the example has been described in which the contact information is displayed in ascending order of distance, beginning from an item with the location information closest to the current location. However, the display order is not limited to this. Rather, the contact information may be displayed in descending order of distance, beginning from an item with the location information farthest from the current location.

After this data display processing is finished, if the user further changes the orientation of the mobile terminal 1, step S18 of the direction information acquisition processing in FIG. 6 (the direction information acquisition processing in step S2 in FIG. 3) is performed again to repeat the subsequent processing. For example, one such case may be where the user checks the displayed search results but cannot obtain a desired search result, and further changes the orientation of the mobile terminal 1 to search again.

Figure 12:
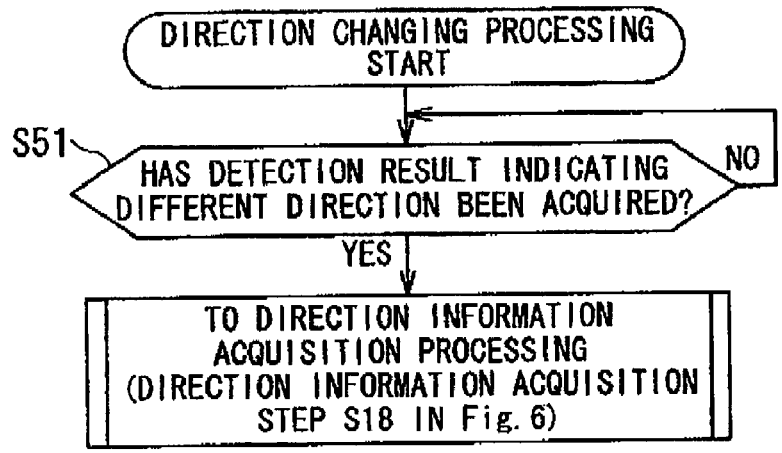
FIG. 12 is a flowchart describing direction changing processing performed when the orientation of the mobile terminal has been changed.

FIG. 12 is a flowchart describing direction changing processing performed when the orientation of the mobile terminal 1 has been changed.

In step S51, the control unit 39 determines whether or not a detection result indicating a direction different from the already acquired direction has been acquired by the geomagnetic sensor 47. Preferably, if the acquired detection result indicates a direction different from the already acquired direction by an angle not smaller than a predetermined angle, the control unit 39 determines that a detection result indicating a direction different from the already acquired direction has been acquired. This is because if a minute direction change of the mobile terminal 1 were to cause searching again, even a direction change unintended by the user would cause searching again and this would reduce the operability.

If it is determined that a detection result indicating a different direction has not been acquired, the control unit 39 waits until a detection result indicating a different direction is acquired.

If it is determined that a detection result indicating a different direction has been acquired by the geomagnetic sensor 47, the control unit 39 returns to the above-described direction information acquisition step S18 in FIG. 6 and repeats the subsequent processing.

Now, another example of displaying search candidates in the above-described data display processing will be described.

Use frequency information about the use frequency may further be added to each contact information item, and the contact information may be displayed as search candidates in descending order of use frequency indicated by the use frequency information. The use frequency information can be determined from an outgoing voice call history or an e-mail transmission history, for example. The use frequency information may be added to the contact information by incrementing the count of outgoing voice calls or transmitted e-mails each time a voice call is made or an e-mail is transmitted, or by determining the use frequency based on the outgoing voice call history or the like at the time of registration as a search candidate.

Figure 13:
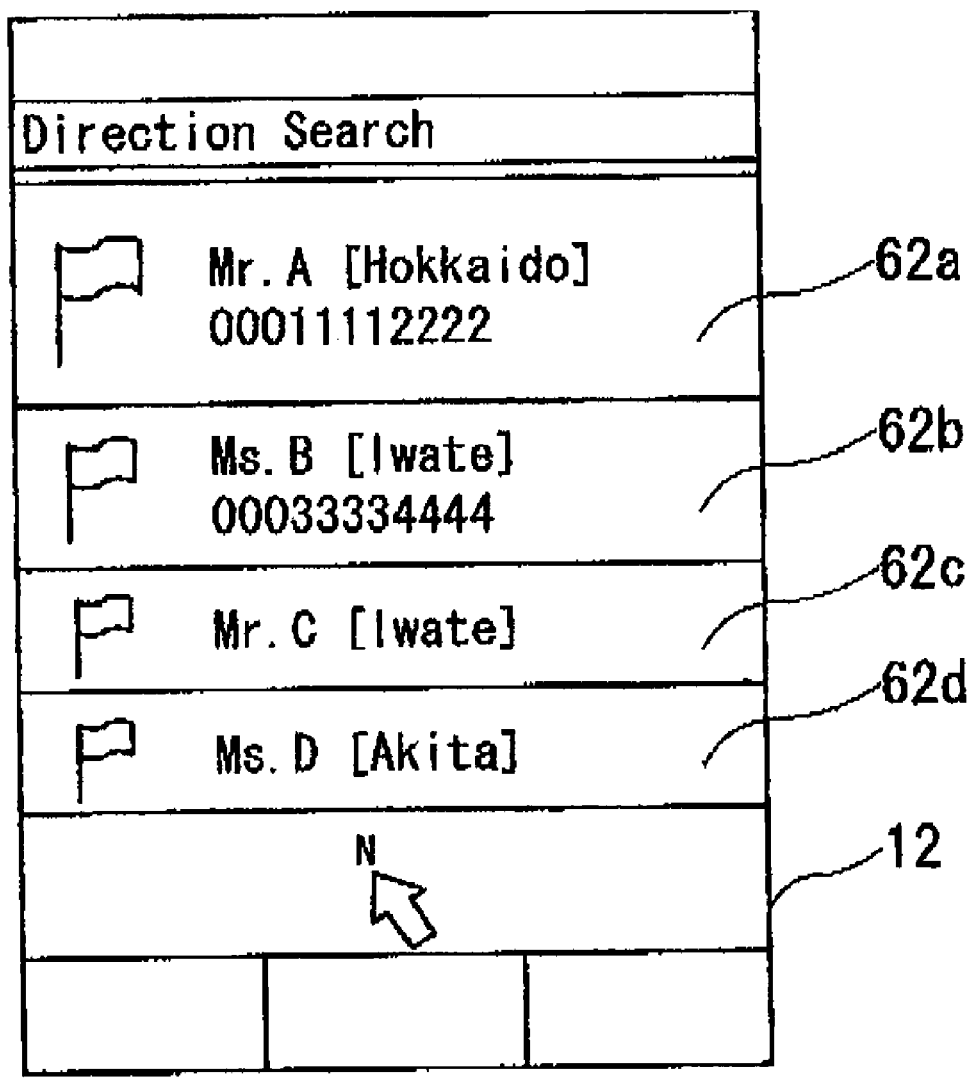
FIG. 13 is a diagram showing exemplary display of search candidates based on use frequencies.

FIG. 13 is a diagram showing exemplary display of search candidates based on use frequencies.

Based on the use frequency information added to the contact information about the search candidates, the control unit 39 has determined that "Mr. A," "Ms. B," "Mr. C," and "Ms. D" have high use frequencies in descending order. The control unit 39 as the display control unit then displays the contact information in order of "Mr. A," "Ms. B," "Mr. C," and "Ms. D." The control unit 39 also displays the contact information by using icons of different sizes preset for different use frequencies so that the user can intuitively recognize the differences among the use frequencies for "Mr. A," "Ms. B," "Mr. C," and "Ms. D." Since the contact information about "Mr. A" includes the highest use frequency, the control unit 39 has displayed an icon 62a of the largest size representing the contact information about "Mr. A." The contact information about "Ms. B" with the second highest use frequency has been displayed with an icon 62b of the second largest size. Further, the contact information about "Mr. C" with the third highest use frequency and "Ms. D" with the fourth highest use frequency has been displayed with icons 62c and 62d of the third largest size.

In this manner, the contact information display based on use frequencies allows preferentially displaying contact information the user probably wants to search for. Thus, the search efficiency can be increased.

Now, an example of display where more than a certain number of contact information items are retrieved as search candidates will be described. For a small number of search candidates, the user can easily find desired contact information among the displayed search candidates. However, for a large number of search candidates, for example if they cannot be displayed on a screen at a time and require several scroll operations for finding desired contact information, the convenience of the direction search may be lost. Therefore, the mobile terminal 1 in this embodiment classifies the contact information as search candidates into predetermined regions. A region name can be selected at the first level, and contact information belonging to the selected region is displayed at the second level.

Figure 14:
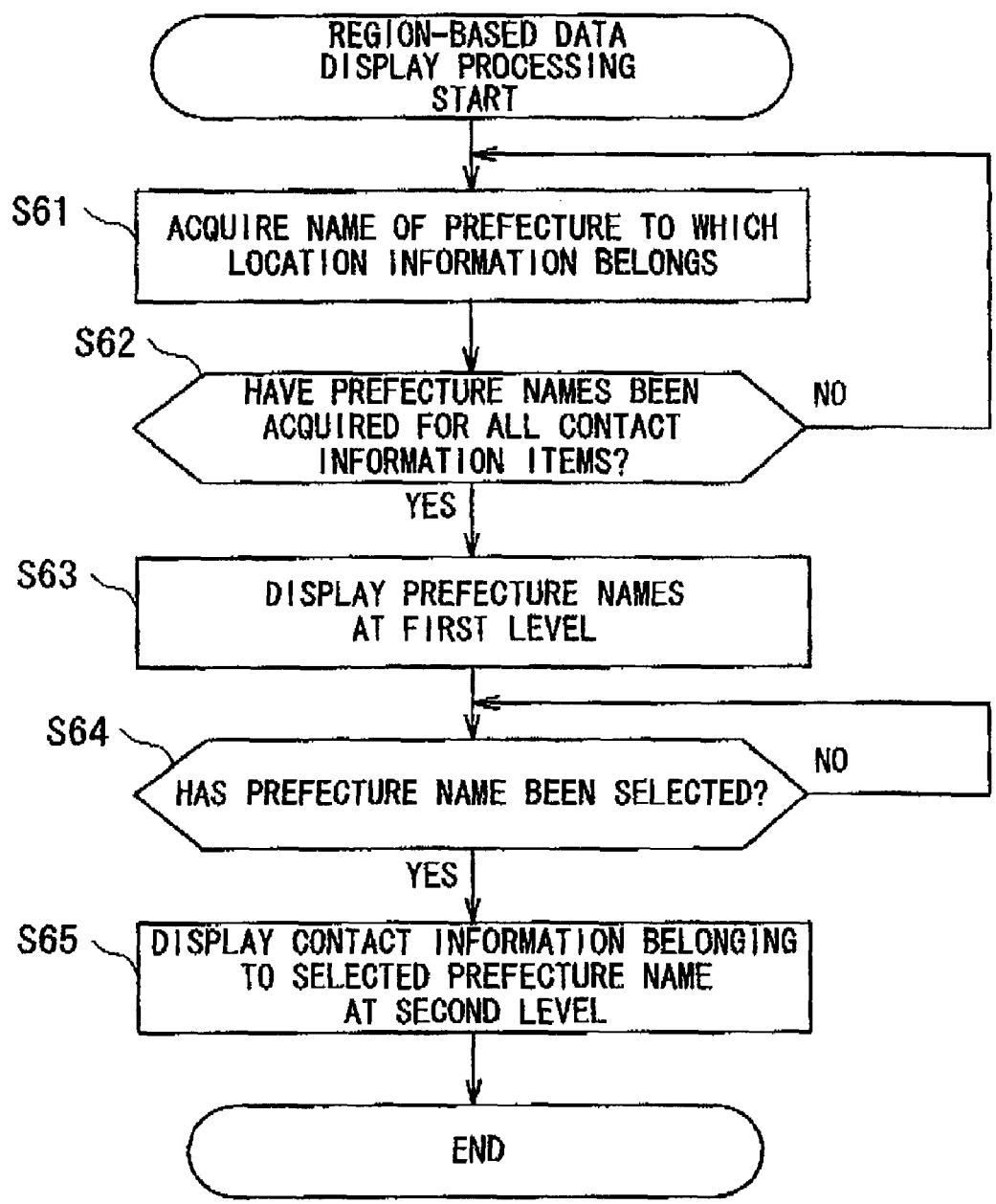
FIG. 14 is a flowchart describing region-based data display processing performed by the control unit as the display control unit, in which search candidates are displayed at two levels.

FIG. 14 is a flowchart describing region-based data display processing performed by the control unit 39 as the display control unit, in which search candidates are displayed at two levels. FIG. 14 will be described for a case where search candidates are displayed at two levels on a prefectural basis.

In step S61, from the location information added to a contact information item as a search candidate, the control unit 39 acquires the name of a prefecture to which the location information belongs. The mobile terminal 1 has a prefecture conversion table that allows a prefecture name to be acquired based on, for example, a latitude and longitude. The prefecture conversion table is an information table in which a prefecture name is assigned in advance to each predetermined range of latitudes and longitudes, for example. The control unit 39 refers to the prefecture conversion table and acquires a prefecture name assigned to the location information.

In step S62, the control unit 39 determines whether or not prefecture names have been acquired for all contact information items as search candidates. If it is determined that contact information items exist for which prefecture names have not been acquired, the control unit 39 repeats the acquisition step S61 and the acquisition determination step S62 until prefecture names for all the contact information items are acquired.

If it is determined that prefecture names have been acquired for all the contact information items as the search candidates, in step S63, the control unit 39 displays the prefecture names acquired for the search candidates in a selectable form at the first level on the touch panel 12 (the display unit 42).

Figure 15A:
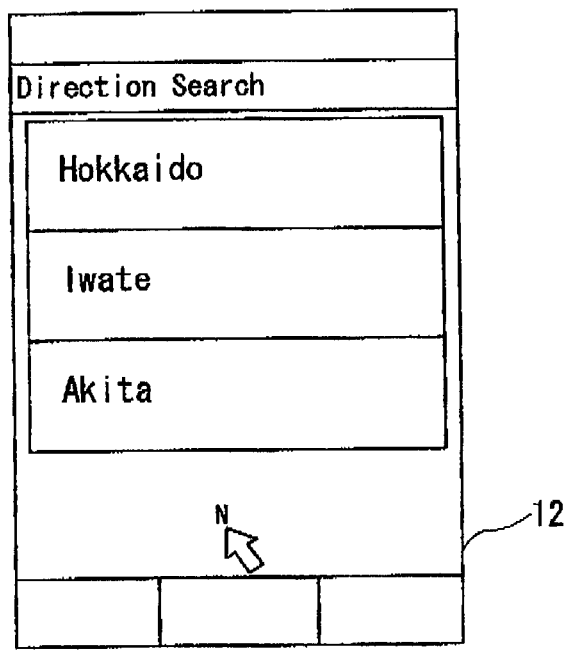
FIGS. 15A and B are diagrams showing exemplary display where the search candidates are displayed at two levels on a prefectural basis.

FIGS. 15A and B are diagrams showing exemplary display where the search candidates are displayed at two levels on a prefectural basis. In FIG. 15A, "Hokkaido," "Iwate," and "Akita" are displayed as exemplary prefecture names into which the contact information as the search candidates has been classified.

In step S64, the control unit 39 determines whether or not a prefecture name has been selected by the user. If it is determined that a prefecture name has not been selected, the control unit 39 waits until a prefecture name is selected.

Figure 15B:
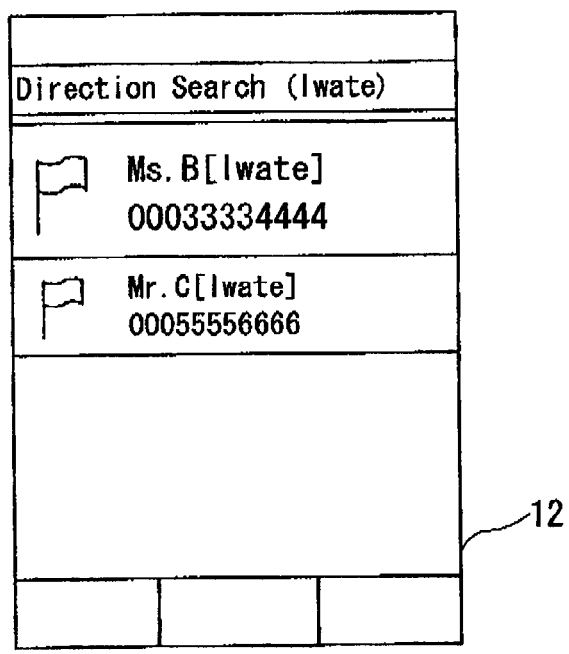

If it is determined that a prefecture name has been selected, the control unit 39 displays contact information belonging to the selected prefecture name at the second level. FIG. 15B shows an example in which "Iwate" has been selected from the prefecture names in FIG. 15A. Once "Iwate" is selected, the control unit 39 displays contact information about "Ms. B" and "Mr. C" classified into the selected "Iwate."

In this manner, for a large number of contact information items as search candidates, the contact information items can be classified into regions such as prefectures and displayed at two levels. Thus, the efficiency of searching for the contact information can be increased.

In the above region-based data display processing, the example has been described in which the contact information is displayed for each prefecture at the first level to which the location information belongs. However, besides prefectures, the contact information items may be classified into regions such as municipal units or countries and displayed to the user. Also, the regions for classification may be user-selectable.

In addition, the example has been described in which the contact information items is classified into two levels. However, the predetermined regions (prefectures) may include the region of two subordinate positions or more further, And the control unit 39 may cause names of the region of subordinate positions to be displayed hierarchically. For example, the control unit 39 displays prefecture name at the first level, then if a prefecture name is selected, the control unit 39 displays municipal name belonging to the selected prefecture name at the second level. And if a municipal name is selected, the control unit 39 displays block name belonging to the selected municipal name at the third level. Then if a block name is selected, the control unit 39 displays the contact information belonging to the selected block name at fourth level. Now, display order switching processing will be described in which the display order of the contact information displayed by the data display processing is switched according to an action applied to the mobile terminal 1. The display order switching processing is performed in response to a change in tilt of the mobile terminal 1 detected with the six-axis sensor 49. For example, when the contact information is displayed in the data display processing of FIG. 11 in ascending order of distance between the location information in the contact information and the current-location information about the mobile terminal 1, and if a certain amount of change in tilt of the mobile terminal 1 is detected, the display order switching processing causes the contact information to be displayed in descending order of distance between the location information and the current-location information.

Figure 16:
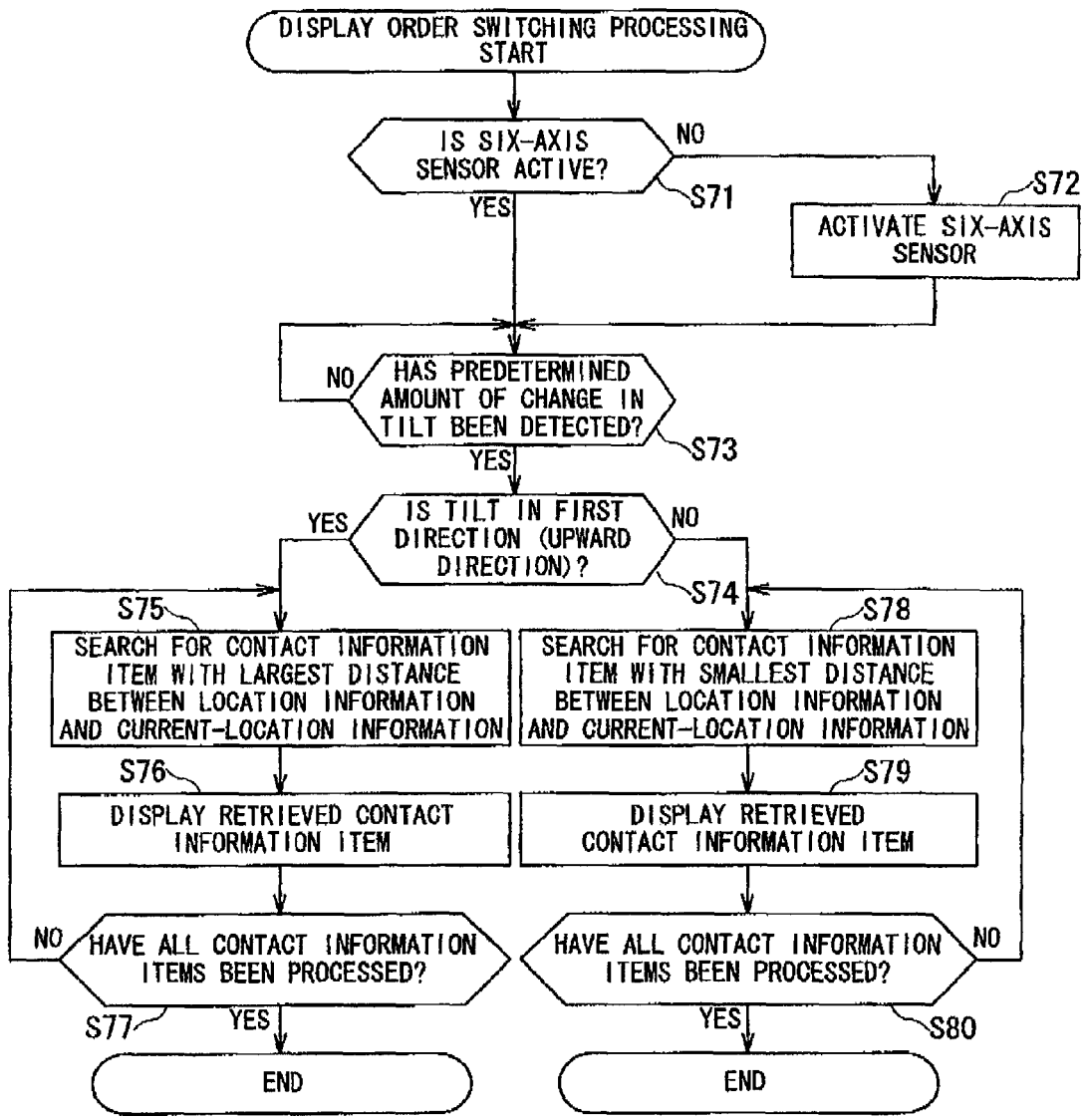
FIG. 16 is a flowchart describing the display order switching processing performed by the control unit of the mobile terminal 1 in this embodiment.

FIG. 16 is a flowchart describing the display order switching processing performed by the control unit 39 of the mobile terminal 1 in this embodiment.

In step S71, the control unit 39 as the tilt detection unit (the action detection unit) determines whether or not the six-axis sensor 49 is active. If it is determined that the six-axis sensor 49 is not active, the control unit 39 activates the six-axis sensor 49 in step S72.

Once the six-axis sensor 49 is activated, in step S73, the control unit 39 determines whether or not the six-axis sensor 49 has detected a predetermined amount of change in tilt of the mobile terminal 1 from the position of the mobile terminal 1 at the time when the contact information is displayed. For example, the control unit 39 determines whether or not the six-axis sensor 49 has detected the predetermined amount of change in tilt of the mobile terminal 1 around the lateral axis of the housing 10 from the position of the mobile terminal 1 at the time when the contact information is displayed. If it is determined that the predetermined amount of change in tilt has not been detected, the control unit 39 waits until a tilt is detected.

If it is determined that the predetermined amount of change in tilt has been detected, in step S74, the control unit 39 determines whether or not the detected tilt is a tilt in the upward direction (a first direction) around the lateral axis of the housing 10.

Figure 17:
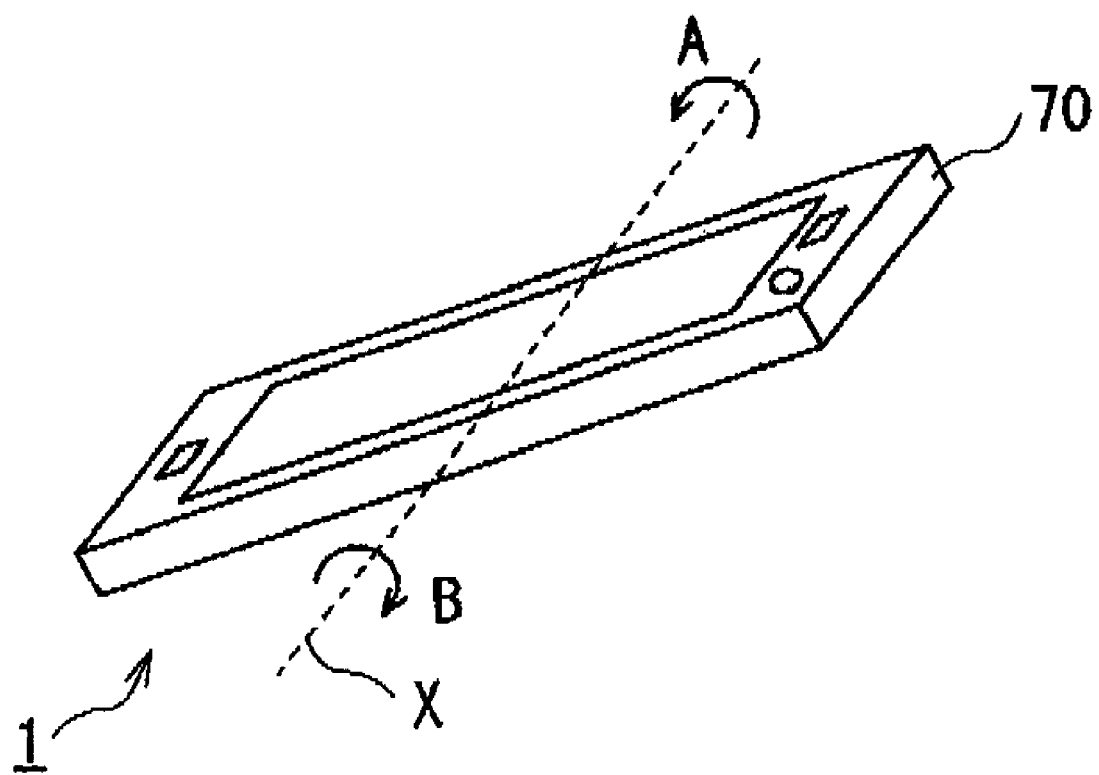
FIG. 17 is a conceptual view describing tilt directions of the mobile terminal.

FIG. 17 is a conceptual view describing tilt directions of the mobile terminal 1.

In FIG. 17, by way of example, rotation around the lateral axis X is a "tilt." A tilt in the upward direction as the first direction refers to a tilt in a direction such that the top (a side 70) is turned upward around the axis X of the housing 10 of the mobile terminal 1 held by the user (the direction of an arrow A).

If it is determined that the detected tilt is a tilt in the upward direction around the lateral axis of the housing 10, in step S75, the control unit 39 searches for contact information with the largest distance between the location information and the current-location information. The way of searching for contact information will not be described in detail, because it is substantially the same as in the search step S41 of the data display processing in FIG. 11 except that contact information with the largest distance between the location information and the current-location information is searched for.

In step S76, the control unit 39 as the display control unit switches the display order so that the contact information is displayed in descending order of distance between the location information and the current-location information (a first order). If the contact information is already displayed in descending order of distance between the location information and the current-location information in step S76, the current display state is maintained with no special switching of the display.

In step S77, the control unit 39 determines whether or not the search step S75 and the display step S76 have been performed for all contact information items registered as search candidates in the data search processing. If it is determined that contact information items exist for which the search step S75 and the display step S76 have not been performed, the control unit 39 returns to the search step S75 and repeats the processing until the search step S75 and the display step S76 are performed for all the contact information items registered as the search candidates.

On the other hand, if it is determined that the detected tilt is a tilt in the downward direction (a second direction) opposite to the upward direction (the first direction) around the lateral axis of the housing 10 (NO in step S74), in step S78, the control unit 39 searches for contact information with the smallest distance between the location information and the current-location information. As shown in FIG. 17, a tilt in the downward direction as the second direction refers to a tilt in a direction such that the top (the side 70) is turned downward around the axis X of the housing 10 of the mobile terminal 1 held by the user (the direction of an arrow B). The way of searching for contact information will not be described in detail, because it is substantially the same as in the search step S41 of the data display processing in FIG. 11.

In step S79, the control unit 39 as the display control unit switches the display order so that the contact information is displayed in a second order, in which the contact information is displayed in ascending order of distance between the location information and the current-location information. The second order is different from the first order, i.e., it is the reverse of the first order. If the contact information is already displayed in ascending order of distance between the location information and the current-location information in step S79, the current display state is maintained with no special switching of the display.

In step S80, the control unit 39 determines whether or not the search step S78 and the display step S79 have been performed for all the contact information items registered as the search candidates in the data search processing. If it is determined that contact information items exist for which the search step S78 and the display step S79 have not been performed, the control unit 39 returns to the search step S78 and repeats the processing until the search step S78 and the display step S79 are performed for all the contact information items registered as the search candidates.

A tilt of the mobile terminal 1 detected by the six-axis sensor 49 is not limited to a tilt around the lateral axis of the housing 10. Rather, it may be a tilt around a longitudinal axis or around an axis perpendicular to the front side of the mobile terminal 1.

The contact information switched in the display order switching processing is not limited to the contact information displayed according to the distance between the location information added to the contact information and the current-location information about the mobile terminal 1. Rather, it may be contact information displayed according to the degree of the use frequency described above. Further, the contact information may be displayed in such a manner that, in response to a predetermined action performed on the mobile terminal 1, contact information listed in a certain order is sequentially displayed from the first item to the last item. For example, when the mobile terminal 1 is tilted upward, the contact information may be sequentially displayed in the order from the first item to the last item, and when the mobile terminal 1 is tilted downward, the contact information may be sequentially displayed in the order from the last item to the first item.

The above example has been described for the case where the display order of the contact information is switched in response to tilts of the mobile terminal 1 in the two directions detected with the six-axis sensor 49. However, other actions on the mobile terminal 1 may trigger the display order switching processing. For example, actions of shaking the mobile terminal 1 (vibrations applied to the mobile terminal 1) or actions of changing the acceleration in two different linear directions of the mobile terminal 1 may be employed, that are detected by the acceleration sensor 48 as the action detection unit.

Now, description will be given of processing of automatically registering the location information without troublesome operations if data registered in the telephone book does not include the location information. The processing to be described below includes processing of automatically adding the location information about a sender mobile terminal to an e-mail at the time of transmitting the e-mail, and processing of automatically adding, at the time of receiving the e-mail, the transmitted location information to contact information about the sender mobile terminal registered in a receiver mobile terminal.

First, description will be given of e-mail creation processing performed in the mobile terminal 1 as a sender of an e-mail (hereinafter simply referred to as a "sender terminal 1").

Figure 18:
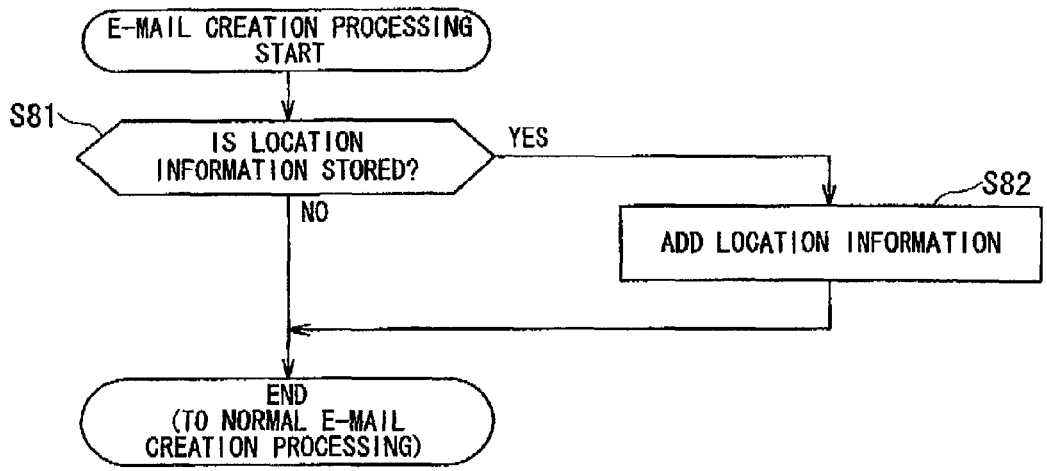
FIG. 18 is a flowchart describing the e-mail creation processing performed in the sender terminal.

FIG. 18 is a flowchart describing the e-mail creation processing performed in the sender terminal 1. The e-mail creation processing is performed in the background upon the start of creating an e-mail, or performed in response to the user's instruction.

In step S81, the control unit 39 of the sender terminal 1 determines whether or not the sender terminal 1 has stored therein the current-location information acquired in the current-location information acquisition step S13 of the current-location information acquisition processing in FIG. 6 and used in subsequent processing such as the data search processing. If it is determined that the current-location information is not stored, the control unit 39 of the sender terminal 1 transitions to normal e-mail creation processing because of the absence of the location information that can be added. The normal e-mail creation processing is, for example, processing of receiving input of a destination, title, body, and the like that constitute the e-mail.

If it is determined that the current-location information is stored, the control unit 39 adds (attaches) the current-location information to the e-mail in step S82. After adding the current-location information to the e-mail, the control unit 39 of the sender terminal 1 transitions to the normal e-mail creation processing.

Next, e-mail reception processing performed in the mobile terminal 1 as a receiver of an e-mail (hereinafter simply referred to as a "receiver terminal 1") will be described.

Figure 19:
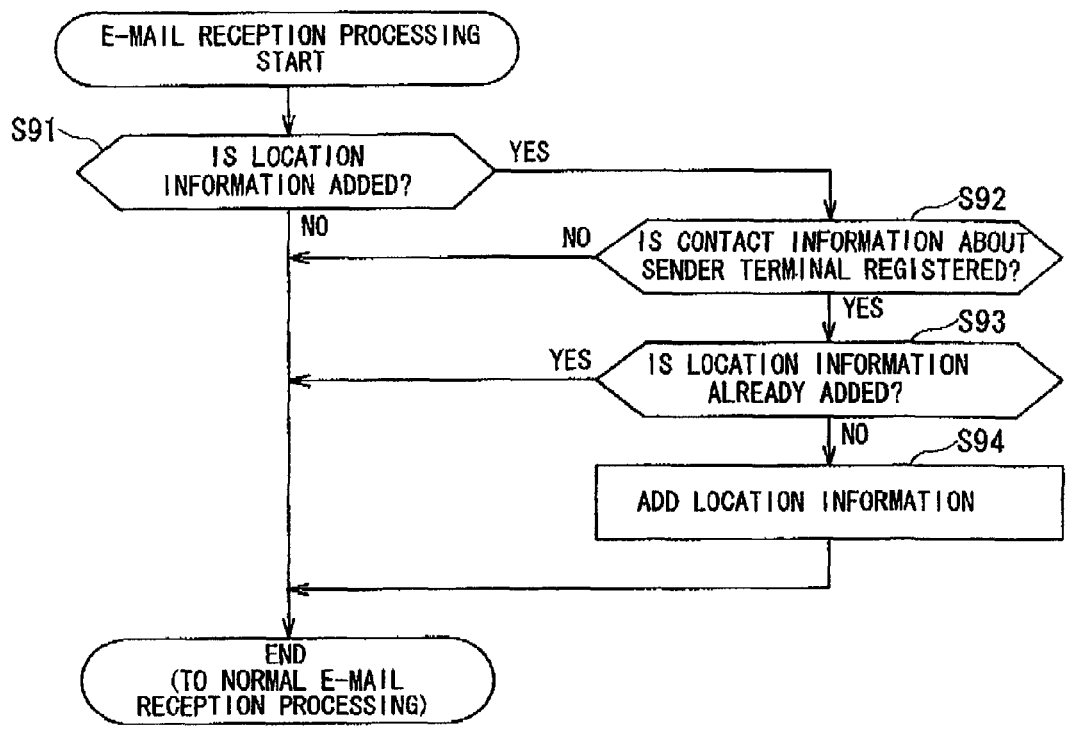
FIG. 19 is a flowchart describing the e-mail reception processing performed in the receiver terminal.

FIG. 19 is a flowchart describing the e-mail reception processing performed in the receiver terminal 1. The e-mail reception processing is performed after an e-mail is received from a base station via the antenna 31.

In step S91, the control unit 39 of the receiver terminal 1 determines whether or not the received e-mail has the location information added thereto. If it is determined that the received e-mail does not have the location information added thereto, the control unit 39 of the receiver terminal 1 transitions to normal e-mail reception processing. The normal e-mail reception processing is processing such as notifying the user of the arrival of the e-mail using a reception sound or a pop-up.

If it is determined that the received e-mail has the location information added thereto, in step S92, the control unit 39 of the receiver terminal 1 determines whether or not contact information about a sender terminal of the e-mail is registered in the telephone book. If it is determined that the contact information about the sender terminal is not registered in the telephone book, the control unit 39 of the receiver terminal 1 transitions to the normal e-mail reception processing.

If it is determined that the contact information about the sender terminal is registered in the telephone book, in step S93, the control unit 39 of the receiver terminal 1 determines whether or not the location information is already added to the contact information about the sender terminal. If it is determined that the location information is already added, the control unit 39 of the receiver terminal 1 transitions to the normal e-mail reception processing.

If it is determined that the location information is not added to the contact information, the control unit 39 of the receiver terminal 1 adds the location information to the contact information about the sender terminal in step S94.

After adding the location information to the contact information about the sender terminal, the control unit 39 of the receiver terminal 1 transitions to the normal e-mail reception processing.

In step S94 of adding the location information, the control unit 39 of the receiver terminal 1 may allow the user to select whether or not to add the location information to the contact information or may automatically add the location information in the background.

In this manner, by configuring the mobile terminal 1 to automatically add the location information at the time of e-mail transmission/reception, data to be searched in the direction search can be automatically increased. Thus, the convenience of the direction search can be further increased.

In the foregoing different sorts of processing, the examples have been described in which the contact information with the location information added thereto is employed as data to be searched in the direction search. However, data to be searched in the direction search is not limited to the contact information but may be a number of types of data in other formats with the location information added thereto.

Examples of data with the location information added thereto include image data shot by, for example, the cameras 15 and 16, received e-mails, and information about nearby buildings and facilities acquired on the Web (landmark information).

For example, for image data shot by the cameras 15 and 16, the location information can be added by acquiring current-location information (latitude and longitude information) via the GPS antenna 46 at the time of shooting, and storing the information as Exif (Exchangeable image file format) data. For received e-mails, for example if contact information about a sender terminal is registered in the telephone book and if the contact information includes location information, this location information can be added as the location information about a received e-mail.

When data search using the direction search is enabled for various types of data, only one format of data may be searchable or different formats of data may be simultaneously searchable. Also, data formats to be searched in the direction search may be user-selectable.

Figure 20:
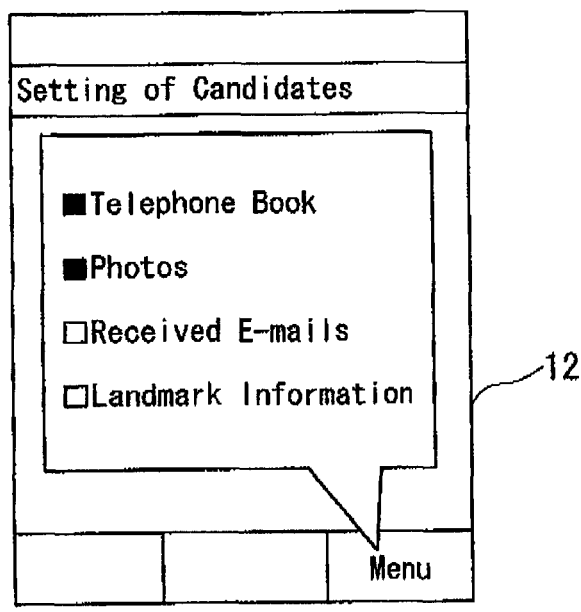
FIG. 20 is a diagram showing exemplary display for setting the types of data to be searched in the direction search.

FIG. 20 is a diagram showing exemplary display for setting the types of data to be searched in the direction search.

For example, the mobile terminal 1 shows "Telephone Book," "Photos (image data)," "Received E-mails," and "Landmark Information" as selectable items to the user. The user can select at least one of these items. FIG. 20 shows exemplary display in which "Telephone Book" and "Photos" have been selected.

As data to be searched in the direction search is expanded beyond the telephone book data, conditions on the display order to be switched in the display order switching processing in FIG. 16 may also be expanded.

Figure 21:
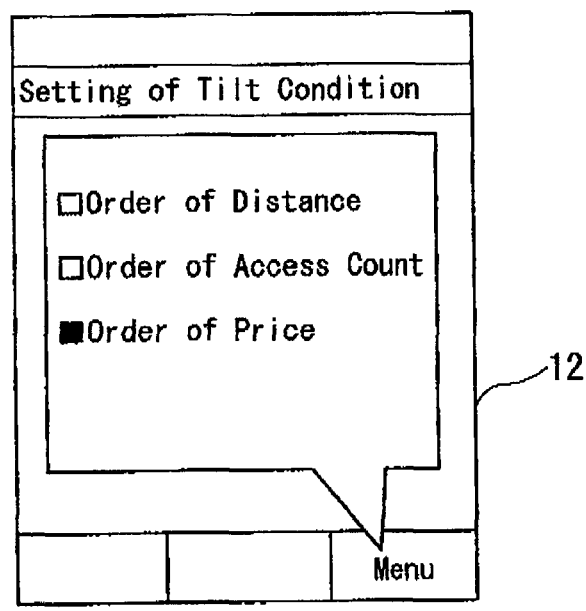
FIG. 21 is a diagram showing exemplary display for setting a condition on the display order used in the display order switching processing.

FIG. 21 is a diagram showing exemplary display for setting a condition on the display order used in the display order switching processing.

In the above-described display order switching processing in FIG. 16, the example has been described in which the display is conditioned on the distance between the location information in the contact information and the current-location information about the mobile terminal 1. However, when the landmark information is searched for hotels and restaurants, for example, items may be displayed in descending order of price when the mobile terminal 1 is tilted in a first direction (e.g., the direction of the arrow A in FIG. 17) and in ascending order of price when tilted in a second direction (e.g., the direction of the arrow B in FIG. 17).

With this mobile terminal 1, various types of data stored in the terminal and various types of data acquired on the Web can be searched for desired data with an intuitive operation, For example, if the user wants to call an acquaintance in Hokkaido, the user can search for expected contact information by orienting the mobile terminal 1 to the north (in the case of where the user is in Tokyo).

Also, if image data shot with the cameras 15 and 16 on occasions such as travels is stored with location information added thereto, desired image data can be searched for with an intuitive operation, For example, if the user wants to search for photos of a travel in Hokkaido, the user can easily search for expected image data by orienting the mobile terminal 1 to the north.

Further, orienting the mobile terminal 1 to various directions allows viewing image data shot at places corresponding to those directions. This can be utilized as entertainment even if search itself is not the main object.

The present invention is applicable to a PDA (Personal Digital Assistant), a personal computer, a portable game machine, a portable music player, a portable video player, and other such mobile terminal.

Moreover, a series of processing described in this embodiment of the present invention can be executed using hardware as well as software.

Moreover, although this embodiment describes an example of the processes executed on the time series in the order of description, the processes include processes executed in parallel or separately, not executed on the time series.

What is claimed is:

1. A mobile terminal comprising:
a current-location information acquisition unit configured to acquire current-location information indicating a current location of the mobile terminal;
a direction information acquisition unit configured to acquire direction information indicating a direction of orientation of the mobile terminal;
a storage unit configured to store data having location information added thereto;
a search unit configured to search for at least one of the data having the location information that is located in the direction from the current location of the mobile terminal and that falls within a predetermined range around the direction based on the current-location information and the direction information; and
a display control unit configured to cause the retrieved data to be displayed,
wherein availability of the location information is further added to the data stored in the storage unit, and the search unit is configured to analyze, when the location information is not registered, an address in the storage unit and acquire the location information based on the address.

2. The mobile terminal according to claim 1, wherein the display control unit causes the data to be displayed in ascending order of distance beginning from the data with the location information closest to the current-location information.

3. The mobile terminal according to claim 1, wherein the data further is added use frequency information about a use frequency, and the display control unit causes the data to be displayed in descending order of use frequency beginning from the data with the use frequency information indicating the highest use frequency.

4. The mobile terminal according to claim 1, wherein the display control unit classifies the retrieved data into predetermined regions based on the location information and causes names of the regions to be displayed at a first level, and if one of the names is selected, causes the data belonging to the region having the selected name to be displayed at a second level.

5. The mobile terminal according to claim 4, wherein
the predetermined regions include the region of two subordinate positions or more further,
the display control unit causes names of the region of subordinate positions to be displayed hierarchically.

6. The mobile terminal according to claim 1, further comprising
an action detection unit configured to detect a first action and a second action different from the first action applied to the mobile terminal, wherein
the display control unit causes the data to be displayed in a first order if the action detection unit detects the first action, and causes the data to be displayed in a second order different from the first order if the action detection unit detects the second action.

7. The mobile terminal according to claim 1, further comprising
a tilt detection unit configured to detect a predetermined amount of change in tilt of the mobile terminal in a first direction and a second direction opposite to the first direction around a predetermined axis of the mobile terminal, wherein
after the data is displayed, the display control unit causes the data to be displayed in a first order if the tilt detection unit detects the amount of change in tilt in the first direction, and causes the data to be displayed in a second order different from the first order if the tilt detection unit detects the amount of change in tilt in the second direction.

8. The mobile terminal according to claim 1, wherein the data is contact information registered in telephone book data.

9. The mobile terminal according to claim 1, wherein the data is a plurality of types of data in different formats.

10. A method for displaying data added location information comprising the steps of:
preparing a mobile terminal storing the data having the location information added thereto;
storing availability of the location information to the data stored in the mobile terminal;
acquiring current-location information indicating a current location of the mobile terminal;
acquiring direction information indicating a direction of orientation of the mobile terminal;
searching for at least one of the data having the location information that is located in the direction from the current location of the mobile terminal and that falls within a predetermined range around the direction based on the current-location information and the direction information;
analyzing, when the location information is not registered, an address in the mobile terminal and acquiring the location information based on the address; and
displaying the retrieved data.

11. The method according to claim 10, wherein the step of displaying comprises displaying the data in ascending order of distance beginning from the data with the location information closest to the current-location information.

12. The method according to claim 10, wherein:
the data further is added use frequency information about a use frequency, and
the step of displaying comprises displaying the data in descending order of use frequency beginning from the data with the use frequency information indicating the highest use frequency.

13. The method according to claim 10, further comprising the step of:
classifying the retrieved data into predetermined regions based on the location information;
the step of displaying comprises displaying names of the regions at a first level, and if one of the names is selected, displaying the data belonging to the region having the selected name at a second level.

14. The method according to claim 13, wherein
the predetermined regions include the region of two subordinate positions or more further,
the steps of displaying comprises displaying names of the region of subordinate positions hierarchically.

15. The method according to claim 10, further comprising the step of
detecting a first action and a second action different from the first action applied to the mobile terminal, wherein
the step of displaying comprises displaying the data in a first order if the first action detects, and displaying the data in a second order different from the first order if the second action detects.

16. The method according to claim 10, further comprising the step of:
detecting a predetermined amount of change in tilt of the mobile terminal in a first direction and a second direction opposite to the first direction around a predetermined axis of the mobile terminal, wherein
the step of displaying comprises after the data is displayed, displaying the data in a first order if the amount of change in tilt in the first direction detects, and displaying the data in a second order different from the first order if the amount of change in tilt in the second direction detects.

17. The method according to claim 10, wherein the data is contact information registered in telephone book data.

18. The method according to claim 10, wherein the data is a plurality of types of data in different formats.

* * * * *